US012592209B2

(12) United States Patent
Tao et al.

(10) Patent No.: US 12,592,209 B2
(45) Date of Patent: *Mar. 31, 2026

(54) MULTIPLEXED DISPLAY PANEL PREVENTING SURFACE NOISE GENERATED DURING SWITCHING OF SWITCHING TRANSISTOR, MULTIPLEXED DISPLAY DEVICE, AND DRIVING METHOD FOR MULTIPLEXED DISPLAY PANEL

(71) Applicant: Wuhan China Star Optoelectronics Technology Co., Ltd., Hubei (CN)

(72) Inventors: Jian Tao, Hubei (CN); Shuai Feng, Hubei (CN); Yafeng Li, Hubei (CN); Zhong Peng, Hubei (CN); Jian He, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/959,687

(22) Filed: Nov. 26, 2024

(65) Prior Publication Data

US 2025/0087180 A1 Mar. 13, 2025

Related U.S. Application Data

(63) Continuation of application No. 17/623,328, filed as application No. PCT/CN2021/139755 on Dec. 20, 2021, now Pat. No. 12,183,300.

(30) Foreign Application Priority Data

Dec. 16, 2021 (CN) ......................... 202111540906.9

(51) Int. Cl.
*G09G 3/36* (2006.01)

(52) U.S. Cl.
CPC ......... *G09G 3/3677* (2013.01); *G09G 3/3688* (2013.01); *G09G 2310/0297* (2013.01)

(58) Field of Classification Search
CPC ...... G09G 3/36; G09G 3/3611; G09G 3/3614; G09G 3/3622; G09G 3/3225; G09G 3/364;

(Continued)

(56) References Cited

U.S. PATENT DOCUMENTS

| | | | | |
|---|---|---|---|---|
| 10,304,401 | B2 | 5/2019 | Zuo et al. | |
| 10,431,136 | B2 * | 10/2019 | Zhou | G09G 3/20 |

(Continued)

FOREIGN PATENT DOCUMENTS

| | | |
|---|---|---|
| CN | 106782405 | 5/2017 |
| CN | 107993629 | 5/2018 |

(Continued)

OTHER PUBLICATIONS

International Search Report and the Written Opinion Dated Sep. 14, 2022 From the International Searching Authority Re. Application No. PCT/CN2021/139755 and Its Translation Into English. (16 Pages).

(Continued)

*Primary Examiner* — Ke Xiao
*Assistant Examiner* — Nelson Lam

(57) ABSTRACT

A multiplexed display panel includes sub-pixels, gate line, data lines, and a demultiplexer. The demultiplexer includes input channels each provided with switching transistors and fanout lines. Each fanout line is correspondingly connected to one data line by one switching transistor to provide one data signal to the one data line. The one switching transistor corresponding to each input channel is controlled by a same control signal. While each gate line scans one row of the sub-pixels, when a rising edge of the control signal reaches (Continued)

an amplitude, and at a moment when the one switching transistor is controlled by the control signal to be on, the demultiplexer is configured to make a difference between a potential reached by a rising edge of one fanout line correspondingly connected to the one data line and a potential of the one data line to be less than a preset threshold.

20 Claims, 9 Drawing Sheets

(58) Field of Classification Search
CPC .. G09G 3/3644; G09G 3/3648; G09G 3/3659; G09G 3/3666; G09G 3/3674; G09G 3/3677; G09G 3/3681; G09G 3/3685; G09G 3/3688; G09G 3/3692; G09G 3/3696; G09G 2310/0297
USPC .................................................... 345/87–104
See application file for complete search history.

(56) References Cited

U.S. PATENT DOCUMENTS

| | | | | |
|---|---|---|---|---|
| 10,991,315 | B2 | 4/2021 | Li et al. | |
| 12,118,911 | B2 | 10/2024 | Wang | |
| 12,183,300 | B2 * | 12/2024 | Tao | G09G 3/3677 |
| 2005/0134541 | A1 * | 6/2005 | Jang | G09G 3/3688 345/94 |
| 2007/0124633 | A1 * | 5/2007 | Kim | G09G 3/3266 714/726 |
| 2009/0066378 | A1 | 3/2009 | Lee et al. | |
| 2009/0251455 | A1 * | 10/2009 | Park | G09G 3/2007 345/84 |
| 2010/0134400 | A1 * | 6/2010 | Chiang | G09G 3/3688 345/98 |
| 2013/0257846 | A1 * | 10/2013 | Matsuda | G09G 3/3648 345/212 |
| 2024/0234438 | A9 * | 7/2024 | Yang | H10D 86/60 |
| 2025/0006104 | A1 * | 1/2025 | Zhang | G09G 3/32 |

FOREIGN PATENT DOCUMENTS

| | | |
|---|---|---|
| CN | 108182915 | 6/2018 |
| CN | 109754753 | 5/2019 |
| CN | 110955091 | 4/2020 |
| CN | 111681591 | 9/2020 |
| CN | 113140177 | 7/2021 |

OTHER PUBLICATIONS

Notification of Office Action and Search Report Dated Jul. 13, 2022 From The State Intellectual Property Office of the People's Republic of China Re. Application No. 202111540906.9 and Its Translation Into English. (16 Pages).

* cited by examiner

MULTIPLEXED DISPLAY PANEL PREVENTING SURFACE NOISE GENERATED DURING SWITCHING OF SWITCHING TRANSISTOR, MULTIPLEXED DISPLAY DEVICE, AND DRIVING METHOD FOR MULTIPLEXED DISPLAY PANEL

RELATED APPLICATIONS

This application is a Continuation of U.S. patent application Ser. No. 17/623,328 filed on Dec. 28, 2021, which is a National Phase of PCT Patent Application No. PCT/CN2021/139755 having International filing date of Dec. 20, 2021, which claims the benefit of priority of Chinese Patent Application No. 202111540906.9 filed on Dec. 16, 2021. The contents of the above applications are all incorporated by reference as if fully set forth herein in their entirety.

FIELD AND BACKGROUND OF THE INVENTION

The present disclosure relates to the field of display technologies, and in particular to a multiplexed display panel and device and a driving method for the multiplexed display panel.

Nano indium tin oxides (ITO) can cut off electronic radiation, ultraviolet rays and infrared rays harmful to a human body due to very good electrical conductivity and transparency, and therefore, ITO is usually sprayed on a display screen as a transparent conductive film while reducing the electronic radiation, the ultraviolet rays and the infrared rays harmful to the human body.

As shown in FIG. 1, in a liquid crystal display panel, an array substrate 10 and a color film substrate 20 are arranged opposite to each other, liquid crystal molecules 30 are arranged between the array substrate 10 and the color film substrate 20, a data line 40 is arranged on the array substrate 10, a common electrode 50 is arranged on the surface, facing the liquid crystal molecules 30, of the array substrate 10 or the color film substrate 20 (when the common electrode 50 is arranged on the surface, facing the liquid crystal molecules 30, of the array substrate 10, a flat layer 70 is arranged between the common electrode 50 and the data line 40), and a back-plated ITO layer 60 is arranged on the surface, away from the liquid crystal molecules 30, of the color film substrate 20 to form a capacitor C1 between the data line 40 and the common electrode 50 and also form a capacitor C2 between the common electrode 50 and the back-plated ITO 60; however, both the common electrode 50 and the back-plated ITO 60 are made of an ITO material, but the resistance of the ITO material is very large, so that when a potential of the data line 40 changes, a voltage of the common electrode 50 may fluctuate due to the coupling effect of the capacitor C1; and since the resistance of the common electrode 50 is very large, the voltage of the common electrode 50 cannot be discharged timely, so that fluctuation of the common electrode 50 is relatively large, and then, fluctuation of the common electrode 50 may also enable a potential of the back-plated ITO 60 to fluctuate due to the capacitor C2. As shown in FIG. 2, there is a corresponding change relationship among the potentials of the data line (data) 40, the common electrode (com) 50 and the back-plated ITO (ito) 60.

In a common display panel, one input channel of a source driver generally corresponds to one data line; and when a pure-color image is displayed, since coupling of data lines with different polarities on the common electrode may mutually cancel in a period of time, the total coupling effect of the data lines on the common electrode is theoretically zero, and a potential of the common electrode may not fluctuate. However, for the multiplexed display panel, the presence of mux switching transistors breaks this balance. Each group of mux switching transistors of the multiplexed display panel turns on one of a plurality of branches of each Source, and then each Source charges the data line needing to be charged via the branch so as to charge all the data lines in a time division manner, as shown in FIG. 3 and FIGS. 4, a 6 to 12 (namely, 1 to 2) multiplexed display panel (setting VGH to be 9 V, VGL to be −7 V, and data to be ±5 V). From a transfer characteristic curve of a thin film transistor (TFT), when the TFT is turned on, if potentials of a source and a drain are different, an instantaneous current may be formed between the source and the drain, and a gate-source voltage difference Vgs is positively related to a source-drain current IDS; the Vgs when the mux switching transistors introduce each Source into a negative potential (S being negative) is larger than the Vgs when the mux switching transistors introduce each Source into a positive potential (S being positive), and if there is a potential difference between each Source and data at the moment when a mux switch is turned on, the IDS when each Source is introduced into the negative potential is larger than the IDS when each Source is introduced into the positive potential, so that couplings of data lines with different polarities on the common electrode cannot mutually cancel within a period of time; the common electrode generates a large fluctuation when the mux switching transistors are turned on, so that the back-plated ITO generates a large fluctuation, which results in generation of a relatively large surface noise, such as a corresponding change relationship among a mux signal, a fanout line signal (or a Source signal) and the surface noise (noise) generated by the display panel when mux1 collected by an oscilloscope is turned on, as shown in FIG. 5, that is when the mux1 is turned on, the relatively large surface noise is generated; and FIG. 6 shows a corresponding relationship screened out by the mux signal and the Source signal in FIG. 5. From FIG. 5 and FIG. 6, the root cause of the surface noise is that when the mux is turned on, the corresponding data signal does not rise to a peak value and is also in a change stage of rising toward the peak value, so that the data signal may fluctuate, which brings about fluctuations in the common electrode and the back-plated ITO.

Therefore, there is an urgent need to provide a novel multiplexed display panel and device and a driving method for the multiplexed display panel for solving the technical problem that when the multiplexed display panel displays a pure-color image, the relatively large surface noise may be generated when the mux switching transistors perform switching.

SUMMARY OF THE INVENTION

The present disclosure provides a multiplexed display panel. The multiplexed display panel includes a plurality of sub-pixels arranged in an array, a plurality of gate lines configured to scan a plurality of rows of the plurality of sub-pixels, a plurality of data lines configured to input data signals to a plurality of columns of the sub-pixels, and a demultiplexer including a plurality of input channels configured to provide the data signals to the plurality of data lines. Each of the plurality of input channels is provided with a plurality of switching transistors and a plurality of fanout lines, each of the plurality of fanout lines is correspondingly connected to one data line of the plurality of data lines by one switching transistor of the plurality of switching transistors to provide one data signal of the data signals to the one data line, and the one switching transistor corresponding to each of the plurality of input channels is controlled by a same control signal to be on and off. While each of the plurality of gate lines scans one row of the plurality of sub-pixels, and when a rising edge of the control signal reaches an amplitude and at a moment when the one switching transistor corresponding to each of the plurality of input channels is controlled to be on by the control signal, the demultiplexer is configured to make a difference between a potential reached by a rising edge of one fanout line of the plurality of fanout lines correspondingly connected to the one data line and a potential of the one data line to be less than a preset threshold.

The present disclosure also provides a multiplexed display device, including the above multiplexed display panel.

The present disclosure also provides a driving method for a multiplexed display panel. The multiplexed display panel includes a plurality of sub-pixels arranged in an array, a plurality of gate lines configured to scan a plurality of rows of the plurality of sub-pixels, a plurality of data lines configured to input data signals to a plurality of columns of the sub-pixels, and a demultiplexer including a plurality of input channels configured to provide the data signals to the plurality of data lines. Each of the plurality of input channels is provided with a plurality of switching transistors and a plurality of fanout lines, each of the plurality of fanout lines is correspondingly connected to one data line of the plurality of data lines by one switching transistor of the plurality of switching transistors to provide one data signal of the data signals to the one data line, and the one switching transistor corresponding to each of the plurality of input channels is controlled by a same control signal to be on and off. The driving method includes steps of: while each of the plurality of gate lines scans one row of the plurality of sub-pixels, and when a rising edge of the control signal reaches an amplitude and at a moment when the one switching transistor corresponding to each of the plurality of input channels is controlled to be on by the control signal, making a difference between a potential reached by a rising edge of one fanout line of the plurality of fanout lines correspondingly connected to the one data line and a potential of the one data line to be less than a preset threshold.

BRIEF DESCRIPTION OF THE SEVERAL VIEWS OF THE DRAWINGS

FIG. 10 (*b*) is a relationship graph of voltage changes of the mux signals shown in FIG. 10 (*a*), different optimized source signals and the surface noises.

FIG. 11 (*b*) is a change relationship graph of the mux signals before and after being optimized shown in FIG. 11 (*a*), different optimized source signal and a surface noise.

FIG. 12 (*b*) is a change relationship graph of different optimized mux signals shown in FIG. 12 (*a*), a source signal and surface noises.

DESCRIPTION OF SPECIFIC EMBODIMENTS OF THE INVENTION

The following clearly and completely describes technical solutions in embodiments of the present disclosure with reference to the accompanying drawings in the embodiments of the present disclosure. Apparently, the described embodiments are only some embodiments rather than all the embodiments of the present disclosure. All other embodiments obtained by a person skilled in the art based on the embodiments of the present disclosure without creative efforts should fall within the protection scope of the present disclosure.

It should be noted in advance that vertical coordinates in the accompanying drawings of the embodiments of the present disclosure all represent time, and horizontal coordinates all represent potential Since each Source needs to continuously switch among M fanout lines for supplying power so as to provide data voltages to M data lines corresponding to the M fanout lines in a time division manner, namely, a potential of each data line is a potential provided by the corresponding Source at the moment when the mux is turned on, when the display panel displays a pure-color image, at the moment when a mux switch is turned on, if the potential of each Source does not rise or fall to the potential of the corresponding data line in the switching process of the mux switch, there is a potential difference between each Source and the corresponding data line, which results in that each Source may pull the corresponding data line at this moment, specifically, each Source providing a data signal with positive polarity may pull the corresponding data line positively, and each Source providing a data signal of negative polarity may pull the corresponding data line negatively.

Figure 1:
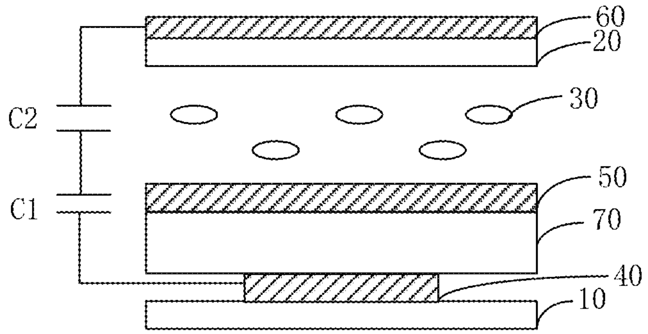
FIG. 1 (Prior Art)
FIG. 1 is a schematic diagram of a structure of a display panel in the prior art.
Figure 2:
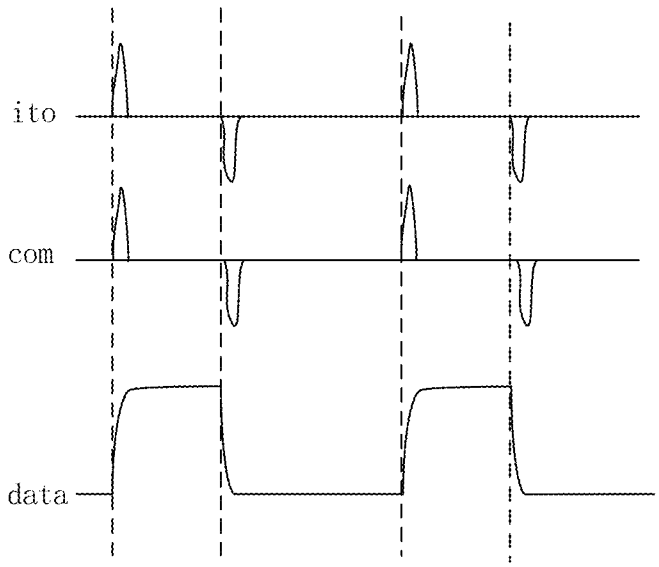
FIG. 2 (Prior Art)
FIG. 2 is a relationship graph of voltage changes of a data signal, a common signal, and a back-plated indium tin oxide (ITO) in the prior art.
Figure 3:
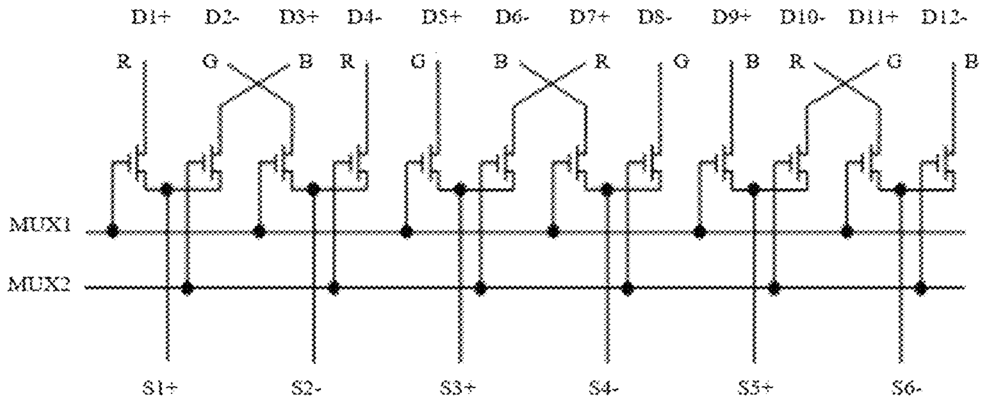
FIG. 3 (Prior Art)
FIG. 3 is a schematic diagram of a structure of a 6 to 12 multiplexed display panel in the prior art.
Figure 4:
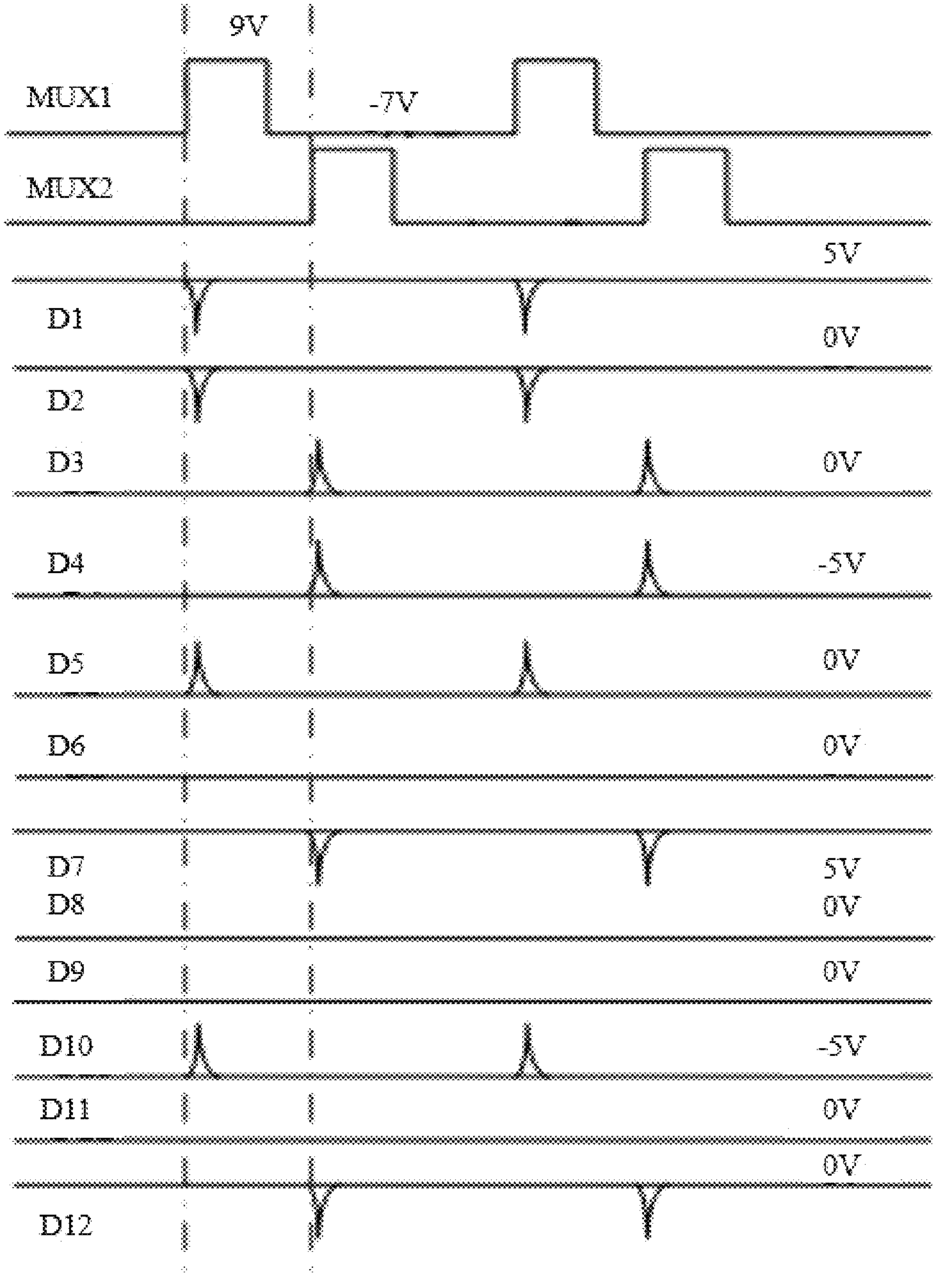
FIG. 4 (Prior Art)
FIG. 4 is a timing diagram of mux signals and data signals of a 6 to 12 multiplexed display panel in the prior art.

As shown in FIG. 3 and FIG. 4, for example, when the display panel displays a red image, data signals should be input to D1, D4, D7 and D4 respectively, specifically, when mux1 is turned on, S1 inputs the data signal to the D1, and S6 inputs the data signal to the D10; and when mux2 is turned on, S2 inputs the data signal to the D4, and S3 inputs the data signal to the D7.

When mux1 is turned on, the S1 pulls the D1 positively, and the S6 pulls the D10 negatively; however, since negative pull generated by the S6 to the D10 is larger than positive pull generated by the S1 to the D1, that is to say, although pulling of the common electrode by the D1 and the D10 can mutually have a certain cancellation effect self, pulling of the common electrode by the D10 is asymmetric with pulling of the common electrode by the D1, so that pulling of the common electrode by the D1 and the D10 cannot mutually cancel at this time. Assuming that voltage of the gate signal Vg of the mux switch is 9 V, voltage of the S1 is 4V, voltage of the D1 is 5 V, voltage of the S2 is −4 V, and voltage of the D10 is −5 V, and assuming that the switching switches TFT1 and TFT10 (not shown in the drawings) of the fanout lines connected with the D1 and the D10 are both N-type thin film transistors, according to the fact that a source of each N-type thin film transistor is generally connected to a potential lower than that of a drain (facilitating turning on of each N-type thin film transistor), Vgs=Vg−s1=9−4−5 V for the TFT1, and Vgs=Vg−D10=9−(−5)−14V for the TFT10, from which, the Vgs of the TFT 10 is much larger than the Vgs of the TFT 1. Therefore, pulling of the common electrode by the D10 is asymmetrical with pulling of the common electrode by the D1, pulling of the common electrode by the D10 is larger than that by the D1, and pulling of the common electrode by the D1 and the D10 cannot mutually cancel at this moment, so that the potential of the common electrode fluctuates, and then the potential of the back-plated ITO fluctuates to enable the display panel to generate a relatively large surface noise at the moment when the mux1 switch is turned on.

Similarly, when the mux2 is turned on, pulling of the common electrode by D4 is asymmetrical with pulling of the common electrode by D7, pulling of the common electrode by the D4 is larger than that by the D7, and pulling of the common electrode by the D4 and the D7 cannot mutually cancel at this moment, so that the potential of the common electrode fluctuates, and then the potential of the back-plated ITO fluctuates to enable the display panel to generate a relatively large surface noise at the moment when the mux2 switch is turned on.

Figure 7:
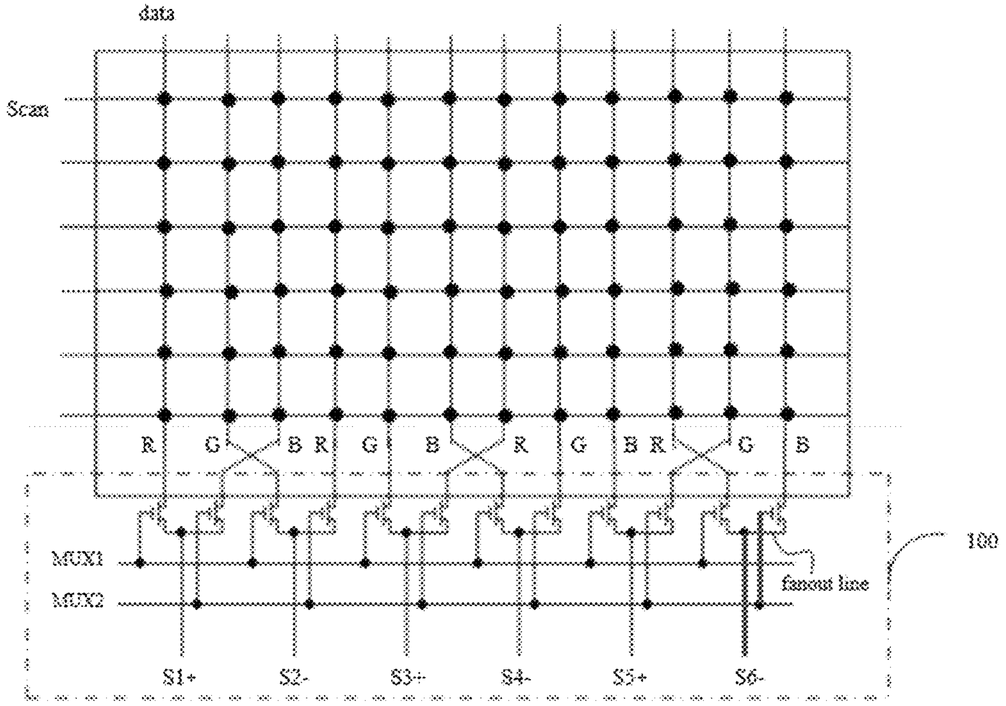
FIG. 7 is a schematic diagram of a structure of a 6 to 12 multiplexed display panel according to an embodiment of the present disclosure.

In view of this, the embodiments of the present disclosure provide a multiplexed display panel, as shown in FIG. 7, and still taking a 6 to 12 multiplexed display panel as an example, the multiplexed display panel includes a plurality of sub-pixels arranged in an array; a plurality of gate lines (Scan lines), each of which is configured to scan a row of sub-pixels; a plurality of data lines, each of which configured to input a data signal to a column of sub-pixels; and a demultiplexer 100 including a plurality of input channels (Source, for example, S1, S2, S3, S4, S5, and S6, wherein the S1, the S3 and the S5 are of positive polarities, and the S2, the S4, and the S6 are of negative polarities). Each input channel provides data signals to M data lines respectively by connecting with M fanout lines, a switching switch is arranged on each fanout line, and the switching switch of one of the M fanout lines corresponding to each input channel is controlled to be on/off by a same control signal mux, where M is an integer greater than 1.

While each gate line scans a row of sub-pixels, the demultiplexer is configured to make a difference between a potential reached by a rising edge of one of the plurality of fanout lines and a potential of the data line corresponding to the fanout line less than a preset threshold when a rising edge of the same control signal reaches an amplitude and each of the input channels provides a data signal to the corresponding data line via the fanout line.

It should be noted that the preset threshold may take a value of 0.1 V, that is, when a certain control signal mux is turned on, the potential of each fanout line controlled by the control signal mux rises to a position where the difference between the potential of each fanout line and the potential of the data corresponding to the fanout line is less than 0.1 V, so that the potential of each fanout line reaches the same potential as that of the corresponding data line as much as possible at the moment when the switching switch is turned on.

It should also be noted that, in order to facilitate the description of the driving situation of the multiplexed display panel displaying a pure-color image, the multiplexed display panel provided by the embodiments of the present disclosure takes the same column of sub-pixels as the display panel of the same color as an example, and generally, each row of sub-pixels is periodically arranged according to different colors, such as being periodically arranged according to R (red), G (green) and B (blue), and each group of R (red), G (green) and B (blue) sub-pixels constitutes one pixel. The source of the display panel is driven with column inversion, that is, the polarities of adjacent data lines are opposite.

Figure 8:
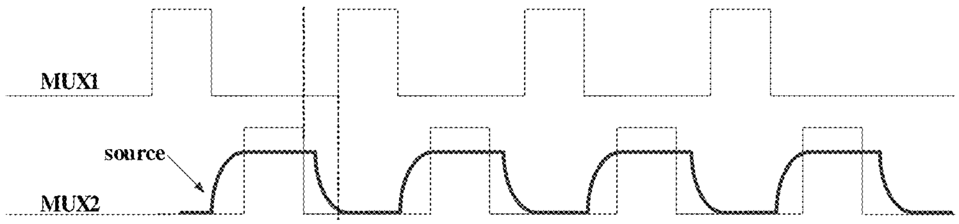
FIG. 8 is a timing diagram of mux signals and a source signal of a multiplexed display panel according to an embodiment of the present disclosure.

The demultiplexer turns on a switching switch controlled by the same control signal (such as mux1 or mux2) while each gate line scans a row of sub-pixels; and at this time, according to a pure-color image to be displayed, each input channel may input a data signal for a data line connected to sub-pixels, into which the data signal needs to be input, in this row of sub-pixels via a corresponding fanout line. It needs to be noted that, at the moment when the switching switch is turned on, the difference between the potential of each fanout line and the potential of the corresponding data line is made less than the preset threshold (the smaller an absolute value of the preset threshold is, the better), which results in that the potential difference between each fanout line and the corresponding data line is relatively small, and the jump of the potential of the data line is relatively small, so that each data line cannot enable the common electrode to largely fluctuate, then the common electrode cannot enable the back-plated ITO to largely fluctuate, and a relatively large surface noise generated by the display panel at the moment when the switching switch is turned on is avoided. Ideally, the potential of each fanout line is adjusted to be equal to that of the corresponding data line, as shown in FIG. 8, so that the potential of each fanout line is adjusted to the potential of the corresponding data line at the moment that the switching switch is turned on, that is, there is no potential difference between each fanout line and the corresponding data line, and the surface noise generated by the display panel at the moment when the switching switch is turned on is minimized. It can be understood that, at this time, the potential of each data line is a potential applied when a data signal is input into a row of sub-pixels on the same column, that is, a uniform potential value corresponding to a gray level required by the pure-color image, the potential of each data line with a positive polarity is a positive uniform potential value, and the potential of each data line with a negative polarity is a negative uniform potential value.

It should be noted that source in the various drawings of the embodiments of the present disclosure shows the absolute value of the potential of each fanout line, that is, when the potential of the data line corresponding to each fanout line is positive, and the mux controls switching switch to be turned on, the potential of each fanout line rises from 0 to the potential of the corresponding data line; and when the potential of the data line corresponding to each fanout line is negative, the potential of each fanout line falls from 0 to the potential of the corresponding data line.

When the multiplexed display panel provided in the embodiments of the present disclosure displays the pure-color image, the switching switch controlled by the same control signal mux is turned on while each gate line scans a row of sub-pixels, and at this moment, the potential of each fanout line corresponding to the data line (data) connected to sub-pixels, into which the data signal is input, is adjusted to the same level as the potential of the corresponding data line as much as possible, and the data signal is provided to the corresponding data line via each fanout line. Since a potential difference between the fanout line and the corresponding data line is relatively small at the moment when the switching switch is turned on, an instantaneous current at this moment is greatly reduced without causing a relatively large jump of the potential of the data line, a common electrode and the back-plated indium tin oxide (ITO) greatly fluctuate, and then the surface noise generated by the display panel at the moment when the switching switch is turned on is greatly reduced.

The switching switch is a thin film transistor, a gate of the thin film transistor is connected to a corresponding control signal, a source of the thin film transistor is connected to the corresponding input channel, and a drain of the thin film transistor is connected to the corresponding data line;

The multiplexed display panel includes a source driving module (not shown in the drawings), and the demultiplexer controls the potential and timing of a data signal, output by each input channel to the corresponding data line via the corresponding fanout line, via the source driving module, that is, the source driving module is configured to provide a source signal of each fanout line to input a data signal into the corresponding data line via the fanout line and then charge sub-pixels needing to be charged via the corresponding data line.

With continued reference to FIG. 8, the demultiplexer reaches 0 at the falling edge of the same control signal (e. G. mux2), the potential of each fanout line providing the data signal to the corresponding data line (data) is adjusted to 0 from the potential of the corresponding data line (data), and there is no potential difference between each fanout line and the corresponding data line at the moment when the control signal (mux2) switches the switching switch to be turned off, so that the potential of the data line cannot jump at this moment, the common electrode and the back-plated ITO do not fluctuate either, and the surface noise generated by the display panel at the moment when the switching switch is turned off is relatively small.

Note that, in FIG. 3, when one control signal (for example, mux2) is switched to another control signal (mux1), there is a transition stage, in which the mux2 is turned off and the mux1 is just turned on, and the potentials of the S2 and the S3 need to be adjusted to 0 from the potentials of the corresponding data lines respectively at this moment; however, at the moment when the mux1 is turned on instantaneously, if the potentials of the S2 and the S3 have not been adjusted to 0 (a conventional Source waveform as shown in FIG. 8 (a)), the D2 and the D5 may fluctuate (fluctuation of the D2 is caused by the S2, and fluctuation of the D5 is caused by the S3), so that at the moment when the mux1 is turned on, the D1 and the D10 fluctuate, and the D2 and the D5 further fluctuate. Similarly, when the mux1 is switched to the mux2, there is a transition stage, in which the mux1 is turned off, and the mux2 is just turned on, and at this time, the potentials of the S1 and the S6 need to be adjusted to 0 from the potentials of the corresponding data lines respectively; however, at the moment when the mux2 is turned on instantaneously, if the potentials of the S1 and the S6 are not adjusted to 0 yet, D3 and D12 may fluctuate (fluctuation of the D3 is caused by the S1, and fluctuation of the D12 is caused by the S6), so that at the moment when the mux2 is turned on, the D4 and the D7 fluctuate, and the D3 and the D12 further fluctuate.

Figure 9:
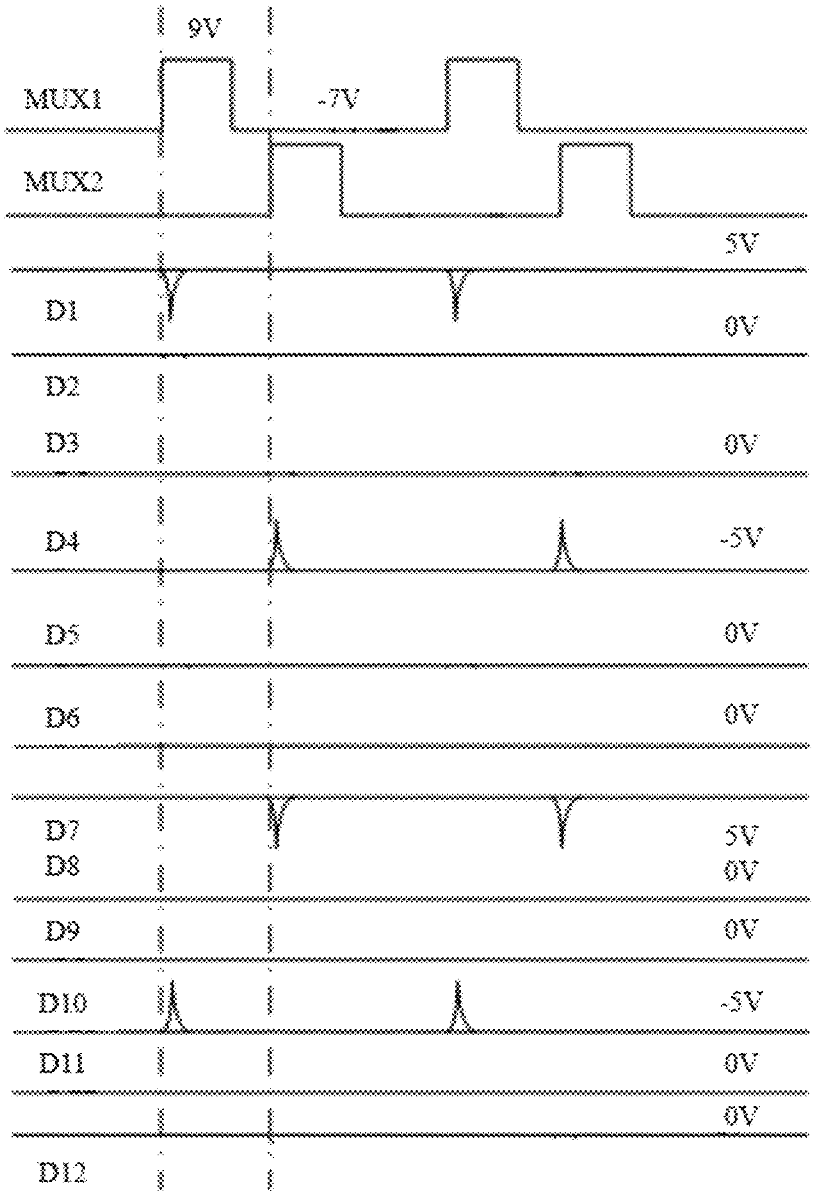
FIG. 9 is a timing diagram of mux signals and source signals of a 6 to 12 multiplexed display panel according to an embodiment of the present disclosure.

Based on this, as shown in FIG. 8, in the embodiments of the present disclosure, after the falling edge of the same control signal (for example, mux2) reaches 0, the falling edge of each fanout line providing the data signal to the corresponding data line data is adjusted to 0 before the rising edge of another control signal (for example, mux1) subsequent to the same control signal (mux2) reaches the amplitude, so as to prevent the situation that when the switching switch controlled by another control signal (mux1) is turned on, each fanout line connected to the switching switch controlled by the current control signal (mux2) of the same input channel affects the data line connected to the switching switch controlled by another control signal (mux1), resulting in more unnecessary surface noises when the two control signals are switched (from the mux2 to the mux1), which further reduces the surface noise of the multiplexed display panel. That is, as shown by the dashed line in FIG. 8, before the mux2 is switched to the mux1, the potential of the Source corresponding to the mux2 is adjusted to 0 before the rising edge of the mux1 begins, such that when the mux1 is turned on, the D1 and the D10 fluctuate only, and the D2 and the D5 do not fluctuate. Similarly, before the mux1 is switched to the mux2, the potential of the source corresponding to the mux1 would be adjusted to 0 before the rising edge of the mux2 begins, so that when the mux2 is turned on, the D4 and the D7 fluctuate only, and the D3 and the D12 do not fluctuate, so that the potentials of the mux signal and the data line signal form a timing diagram as shown in FIG. 9

It is emphasized that the purpose of the present disclosure is to minimize the difference between the potential of the data line (data) connected to the sub-pixels, into which the data signal needs to be input, and the potential of the corresponding fanout line (provided by the channel source) inputting the data signal into the data line at the moment when the switching switch is turned on. Specifically, the embodiments of the present disclosure can achieve this effect in the following three ways, all of which take a change of the mux2 as an example.

Figure 10A:
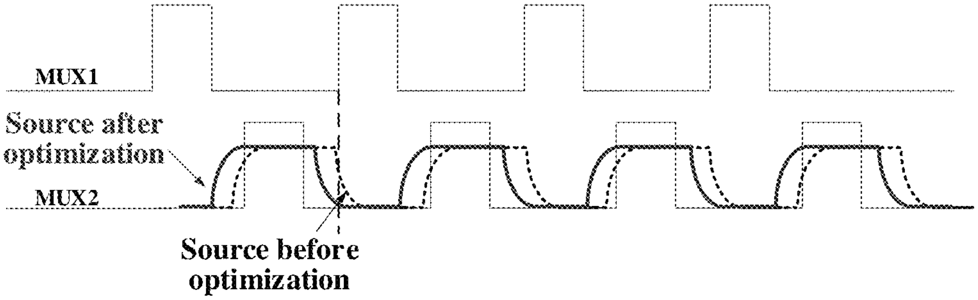
FIG. 10 (*a*) is a first timing diagram of mux signals and source signals before and after being optimized of a multiplexed display panel according to an embodiment of the present disclosure.
Figure 10B:
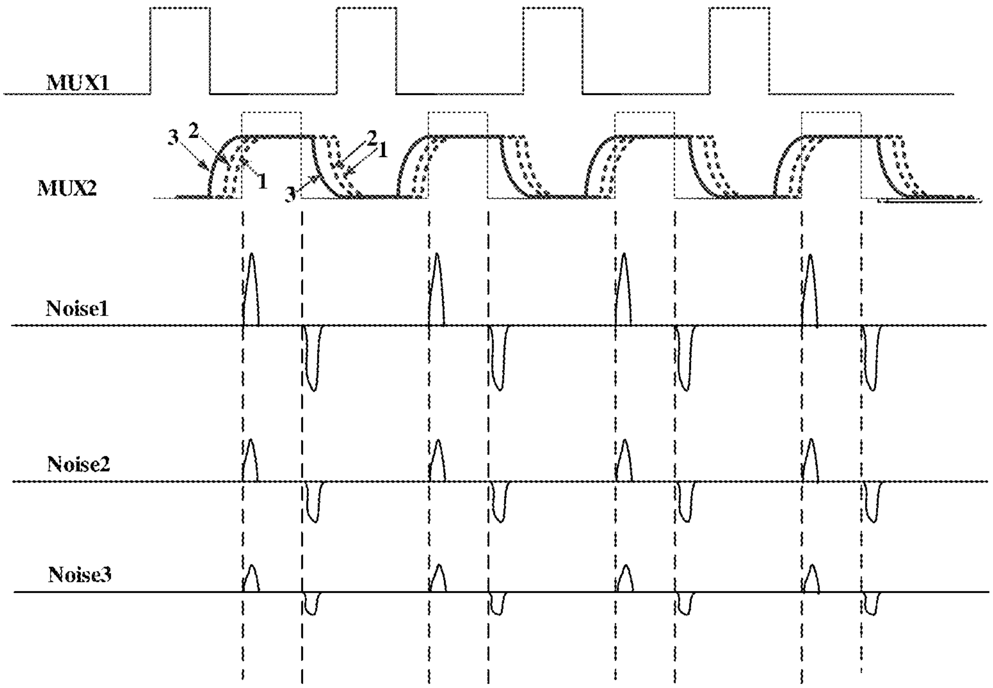

The demultiplexer is specifically configured to, before the rising edge of the same control signal mux reaches the amplitude, adjust the rising edge of each fanout line providing the data signal to the corresponding data line (data) from 0 to the potential of the data line (data) corresponding to the fanout line in advance. That is, the source signal of each fanout line is shifted to the left by a distance, and the source signal of each fanout line is adjusted from the position in FIG. 4 to the position as shown in FIG. 10 (*a*), so that the potential of each fanout line substantially reaches the potential of the corresponding data line before the switching switch is turned on. As shown in FIG. 10 (*b*), from step-by-step adjustment of curve 1→curve 2→curve 3, the larger the distance shifting to the left, the smaller the potential difference between each fanout line and the corresponding data line at the moment when the switching switch is turned on is, and the smaller the caused surface noise is, wherein noise1 corresponds to the curve 1, noise2 corresponds to the curve 2 and noise3 corresponds to the curve 3.

Figure 11A:
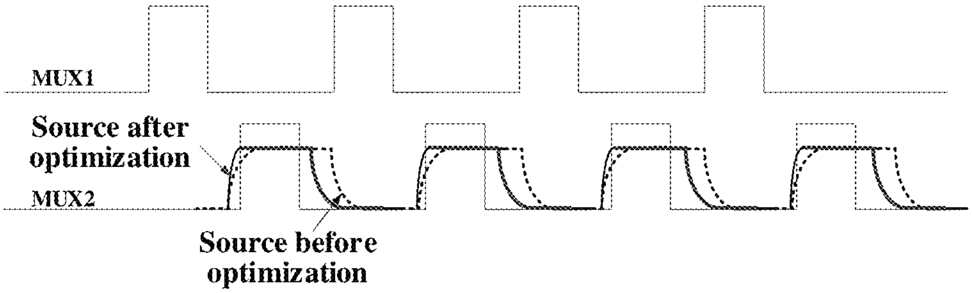
FIG. 11 (*a*) is a second timing diagram of mux signals and source signals before and after being optimized of a multiplexed display panel according to an embodiment of the present disclosure.
Figure 11B:
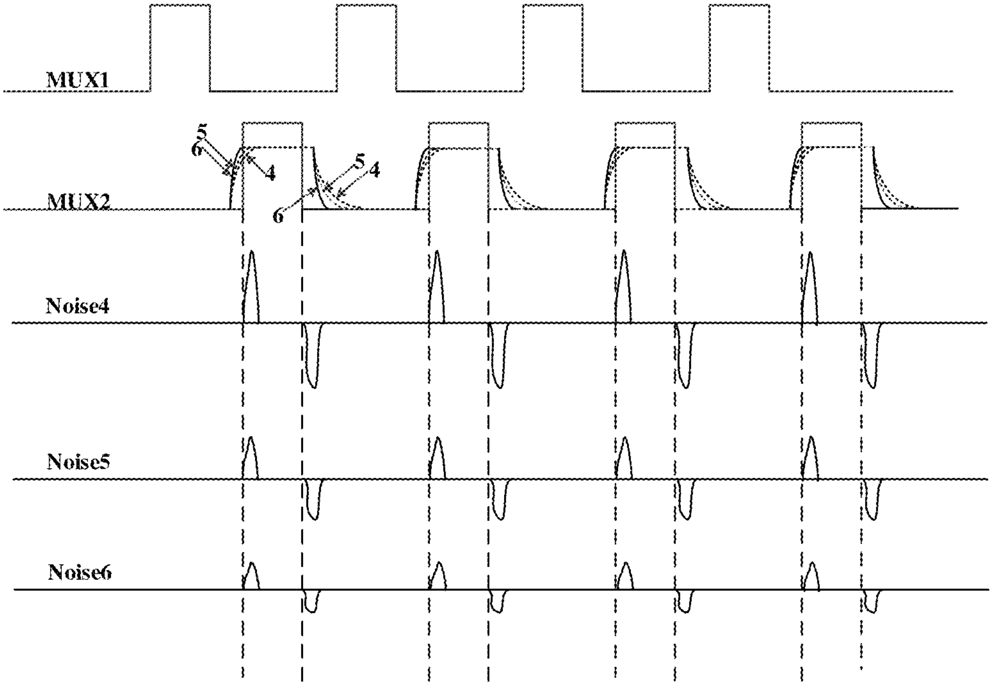

Or the demultiplexer is specifically configured to, before the rising edge of the same control signal mux reaches the amplitude, reduce a duration that the rising edge of each fanout line providing the data signal to the corresponding data line data reaches the potential of the data line (data) corresponding to each fanout line from 0, for example, the duration is shortened from 0.8-1 μs to 0.6-0.8 μs, that is, the consumed time that the potential of each fanout line providing the data signal to the corresponding data line is adjusted from 0 to the potential of the corresponding data line is reduced, that is, the time for adjusting the potential of each fanout line from 0 (rising or falling) to the potential of the corresponding data line is shortened. As shown in FIG. 11 (*a*), with a case that the potential of each fanout line rises from 0 to the potential of the corresponding data line as an example, the faster each fanout line rises before the corresponding switching switch is turned on, the smaller the potential difference between each fanout line and the corresponding data line is when the switching switch is turned on. As shown in FIG. 11 (*b*), from step-by-step adjustment of curve 4→curve 5→curve 6, the faster the potential of the fanout line rises, the smaller the potential difference between each fanout line and the corresponding data line is at the moment when the switching switch is turned on, and the smaller the caused surface noise is, wherein noise4 corresponds to the curve 4, noise5 corresponds to the curve 5 and noise6 corresponds to the curve 6.

Figure 12A:
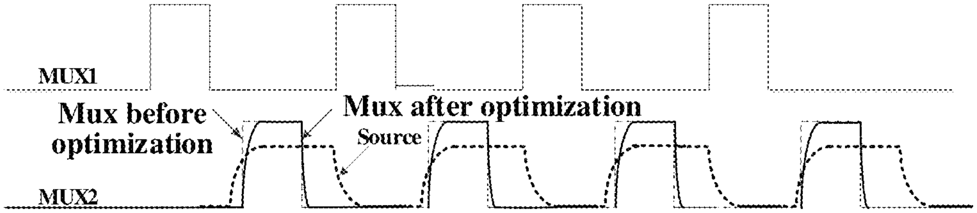
FIG. 12 (*a*) is a timing diagram of mux signals before and after being optimized and source signals of a multiplexed display panel according to an embodiment of the present disclosure.
Figure 12B:
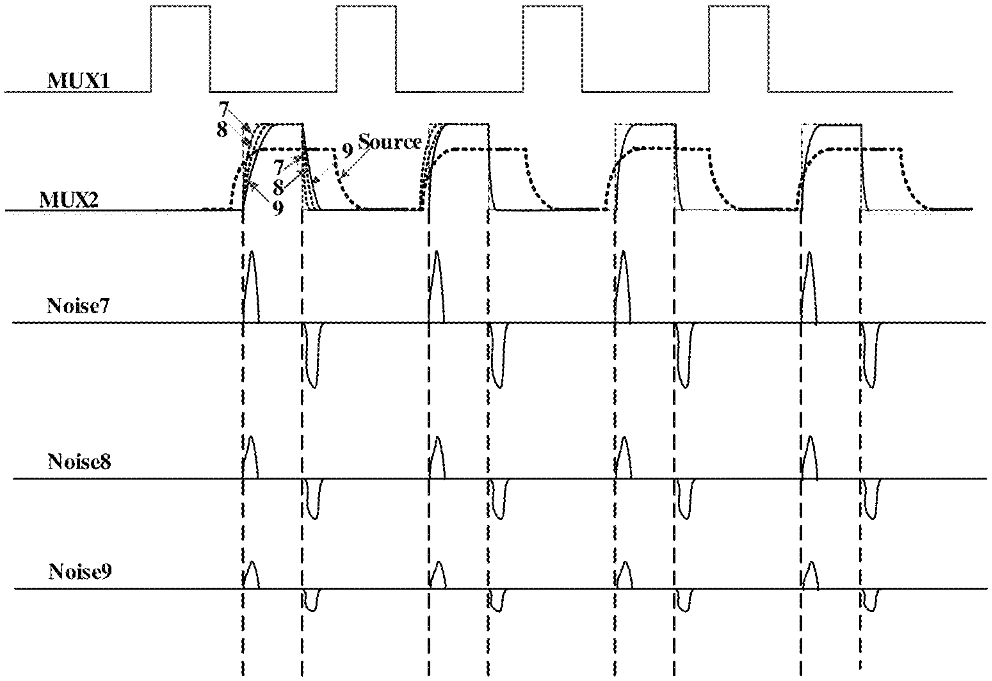

Alternatively, the demultiplexer is specifically configured to prolong the duration that the rising edge of the same control signal reaches the amplitude from 0, that is, prolong the consumed time that the switching switch is turned on, for example, from 0.1-0.2 μs to 0.3-0.4 μs, that is, as shown in FIG. 12 (*a*), the rising time of the control signal mux controlling the switching switch is prolonged. By prolonging the rising time of the control signal mux corresponding to the switching switch (equivalent to letting the control signal mux wait for the Source signal to rise), the potential difference between each fanout line and the corresponding data line is reduced when the switching switch is turned on. As shown in FIG. 12 (*b*), from step-by-step adjustment of curve 7→curve 8→curve 9, the slower the switching switch is turned on, the smaller the potential difference between each fanout line and the corresponding data line is at the moment when the switching switch is turned on, and the smaller the caused surface noise is, wherein noise7 corresponds to the curve 7, noise8 corresponds to the curve 8 and noise9 corresponds to the curve 9.

That is, the embodiments of the present disclosure adjust the mux signal or the source signal in at least one of the above three ways, so that the difference between the potential of the data line connected with the sub-pixels, into which the data signal needs to be input, and the potential of the corresponding fanout line input the data into the data line at the moment when the switching switch is turned on is minimized, and then the surface noise is reduced.

Figure 13:
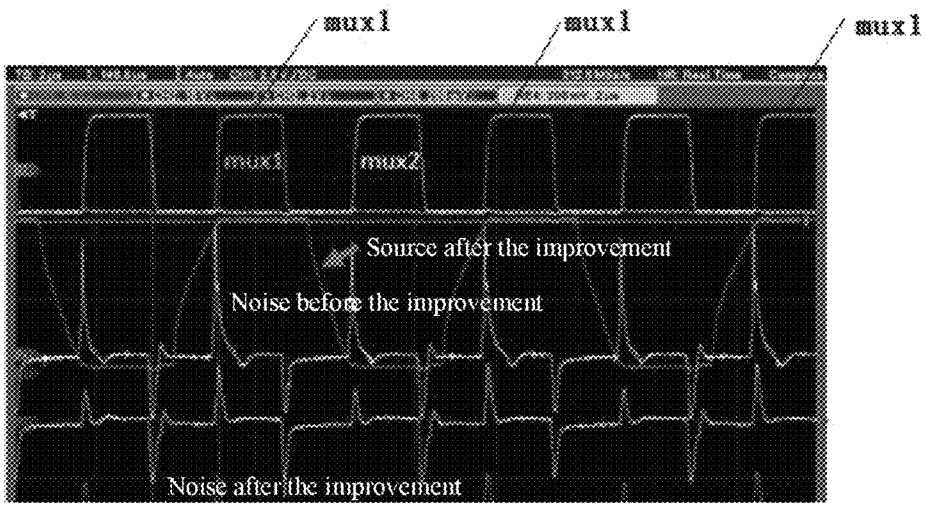
FIG. 13 is a change relationship graph of mux signals, a source signal and surface noises of a multiplexed display panel according to an embodiment of the present disclosure.

FIG. 13 shows a corresponding change relationship among the mux1 signal generated by the display panel, the fanout line signal (or Source signal) and the noise before and after being improved when the mux1 acquired by an oscilloscope is turned on after the mux signal or the source signal is adjusted in at least one of the above three ways.

Figure 5:
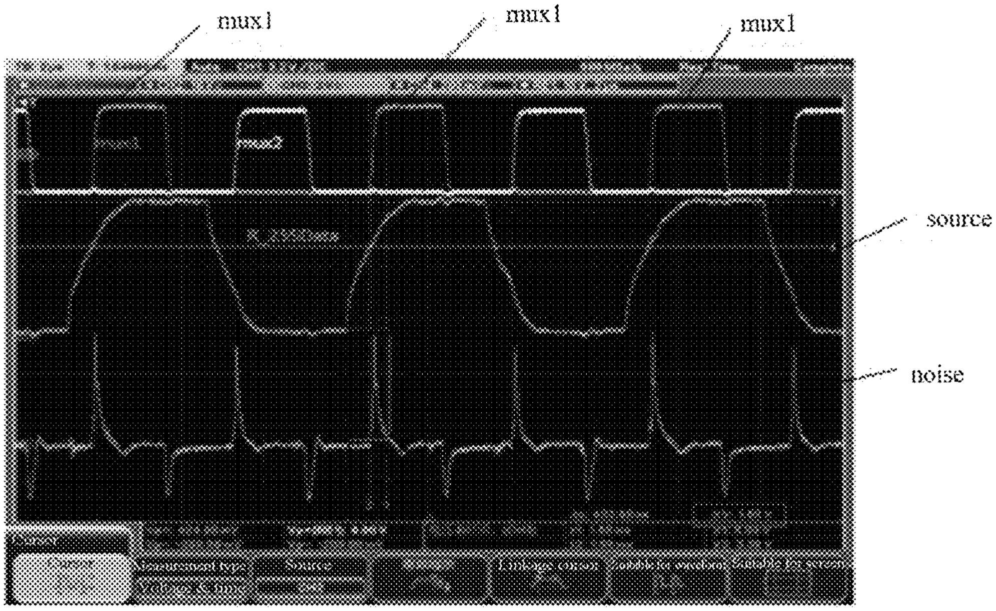
FIG. 5 (Prior Art)
FIG. 5 is a change relationship graph of mux signals, a source signal and a surface noise of a multiplexed display panel in the prior art.
Figure 6:
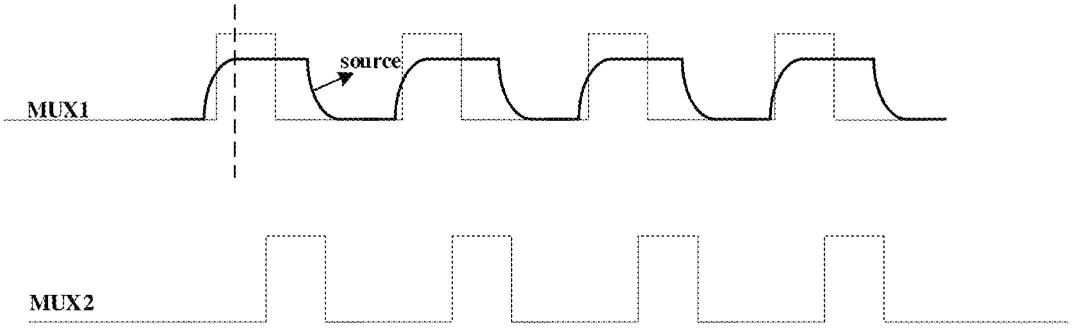
FIG. 6 (Prior Art)
FIG. 6 is a timing diagram of mux signals and a source signal of a multiplexed display panel in the prior art.

Note that, in FIG. 5 or FIG. 13, even if there is no potential difference between each fanout line and the corresponding data line at the moment when the switching switch is turned on in an ideal case, there is still a certain conduction current between each fanout line and the corresponding data line at the moment when each fanout line and the corresponding data line are turned on, so that the data line may still slightly fluctuate, resulting in that the common electrode and the back-plated ITO are accompanied by a slight fluctuation, and then a slight surface noise is formed. Similarly, even if there is no potential difference between each fanout line and the corresponding data line at the moment when the switching switch is turned off, there is still a certain off-state current between each fanout line and the corresponding data line at the moment when the switching switch is turned off, and thus the slight surface noise may further be formed.

Figure 14:
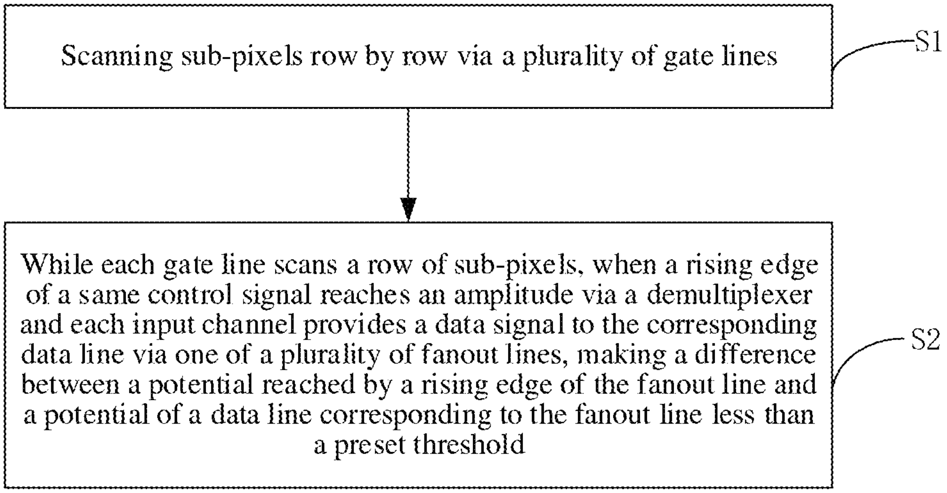
FIG. 14 is a flowchart of a driving method for a multiplexed display panel according to an embodiment of the present disclosure.

Based on the above-mentioned embodiments, as shown in FIG. 14, the embodiments of the present disclosure further provide a driving method for a multiplexed display panel, including steps of:

S1, scanning sub-pixels row by row via a plurality of gate lines; and

S2, while each gate line scans a row of sub-pixels, when a rising edge of a same control signal reaches an amplitude via a demultiplexer and each input channel provides a data signal to the corresponding data line via one of a plurality of fanout lines, making a difference between a potential reached by a rising edge of the fanout line and a potential of a data line corresponding to the fanout line less than a preset threshold.

In the driving method for the multiplexed display panel provided by the embodiments of the present disclosure, when the multiplexed display panel displays a pure-color image, a switching switch controlled by the same control signal is turned on while each gate line scans a row of sub-pixels; and at this time, the potential of each fanout line corresponding to the data line connected to sub-pixels, into which the data signal needs to be input, is adjusted to the same level as the potential of the data line as much as possible, and the data signal is provided to the corresponding data line via each fanout line. Since a potential difference between the fanout line and the corresponding data line is relatively small at the moment when the switching switch is turned on, an instantaneous current at this moment is greatly reduced without causing a relatively large jump of the potential of the data line, a common electrode and the back-plated indium tin oxide (ITO) greatly fluctuate, and then the surface noise generated by the display panel at the moment when the switching switch is turned on is greatly reduced.

In some embodiments, the driving method for the multiplexed display panel further includes step of: after the falling edge of the same control signal reaches 0, the potential of each fanout line providing the data signal to the corresponding data line to 0 from the potential of the corresponding data line via the demultiplexer.

In some embodiments, the driving method for the multiplexed display panel further includes step of: after the falling edge of the same control signal reaches 0, adjusting the falling edge of each fanout line providing the data signal to the corresponding data line to 0 via the demultiplexer before a rising edge of another control signal subsequent to the same control signal reaches the amplitude.

In some embodiments, said reducing the difference between the potential reached by the rising edge of each fanout line and the potential of the data line corresponding to the fanout line specifically includes step of: before the rising edge of the same control signal reaches the amplitude, adjusting the rising edge of each fanout line providing the data signal to the corresponding data line from 0 to the potential of the data line corresponding to each fanout line via the demultiplexer in advance.

In some embodiments, said reducing the difference between the potential reached by the rising edge of each fanout line and the potential of the data line corresponding to the fanout line specifically includes step of: before the rising edge of the same control signal reaches the amplitude, reducing a duration that a rising edge of each fanout line providing the data signal to the corresponding data line reaches a potential of the data line corresponding to the fanout line from 0 via the demultiplexer.

In some embodiments, said reducing the difference between the potential reached by the rising edge of each fanout line and the potential of the data line corresponding to the fanout line specifically includes step of: prolonging the duration that the rising edge of the same control signal reaches the amplitude from 0.

It is worth mentioning that a reloaded image and a pure-color image are commonly used detection images before the display panel leaves a factory. Since when the display panel displays a non-pure-color image, the potentials of data of a preceding row of sub-pixels on one column and the data of a following row of sub-pixels on the same column are different, there is a potential difference between the data of the preceding row of sub-pixels and the data of the following row of sub-pixels self, which results in that the source of the following row may pull the data of the preceding row certainly when the data of the following row is input into the source. Therefore, this solution is not applicable to reduce the noise of the non-pure-color image.

It is to be understood that, for a person of ordinary skill in the art, equivalent replacements or changes can be made according to the technical solutions and the invention concept of the present disclosure, and all these changes or replacements should fall within the protection scope of the appended claims of the present disclosure.

What is claimed is:

1. A multiplexed display panel, comprising:

a plurality of sub-pixels arranged in an array;

a plurality of gate lines configured to scan a plurality of rows of the plurality of sub-pixels;

a plurality of data lines configured to input data signals to a plurality of columns of the plurality of sub-pixels; and a demultiplexer comprising a plurality of input channels configured to provide the data signals to the plurality of data lines, wherein each of the plurality of input channels is provided with a plurality of switching transistors and a plurality of fanout lines, each of the plurality of fanout lines is correspondingly connected to one data line of the plurality of data lines by one switching transistor of the plurality of switching transistors to provide one data signal of the data signals to the one data line, and the one switching transistor corresponding to each of the plurality of input channels is controlled by a same control signal to be switched on and switched off; and wherein while each of the plurality of gate lines scans one row of the plurality of sub-pixels, and when a rising edge of the control signal reaches an amplitude and at a moment when the one switching transistor corresponding to each of the plurality of input channels is controlled to be switched on by the control signal, the demultiplexer is configured to make a difference between a potential reached by a rising edge of one fanout line of the plurality of fanout lines correspondingly connected to the one data line and a potential of the one data line to be less than a preset threshold.

2. The multiplexed display panel of claim 1, wherein the demultiplexer is further configured to, after a falling edge of the control signal reaches zero (0), adjust the potential of the one fanout line to zero (0) from the potential of the one data line.

3. The multiplexed display panel of claim 1, wherein the demultiplexer is further configured to, after a falling edge of the control signal reaches zero (0), adjust a falling edge of the one fanout line to zero (0) before a rising edge of another control signal subsequent to the control signal reaches the amplitude.

4. The multiplexed display panel of claim 1, wherein the demultiplexer is configured to, before the rising edge of the control signal reaches the amplitude, adjust the rising edge of the one fanout line from zero (0) to the potential of the one data line in advance.

5. The multiplexed display panel of claim 1, wherein the demultiplexer is configured to, before the rising edge of the control signal reaches the amplitude, reduce a duration that the rising edge of the one fanout line reaches the potential of the one data line from zero (0).

6. The multiplexed display panel of claim 5, wherein the duration that the rising edge of the one fanout line reaches the potential of the one data line from zero (0) ranges from 0.6 μs to 0.8 μs.

7. The multiplexed display panel of claim 1, wherein the demultiplexer is configured to prolong a duration that the rising edge of the control signal reaches the amplitude from zero (0).

8. The multiplexed display panel of claim 7, wherein the duration that the rising edge of the control signal reaches the amplitude from zero (0) ranges from 0.3 μs to 0.4 μs.

9. The multiplexed display panel of claim 1, further comprising a source driving module, wherein the demultiplexer is configured to control a potential and timing of each of the data signals by the source driving module.

10. The multiplexed display panel of claim 1, wherein the preset threshold is 0.1 V.

11. A multiplexed display device, comprising the multiplexed display panel, and the multiplexed display panel comprising:

a plurality of sub-pixels arranged in an array;

a plurality of gate lines configured to scan a plurality of rows of the plurality of sub-pixels;

a plurality of data lines configured to input data signals to a plurality of columns of the plurality of sub-pixels; and a demultiplexer comprising a plurality of input channels configured to provide the data signals to the plurality of data lines, wherein each of the plurality of input channels is provided with a plurality of switching transistors and a plurality of fanout lines, each of the plurality of fanout lines is correspondingly connected to one data line of the plurality of data lines by one switching transistor of the plurality of switching transistors to provide one data signal of the data signals to the one data line, and the one switching transistor corresponding to each of the plurality of input channels is controlled by a same control signal to be switched on and switched off; and wherein while each of the plurality of gate lines scans one row of the plurality of sub-pixels, and when a rising edge of the control signal reaches an amplitude and at a moment when the one switching transistor corresponding to each of the plurality of input channels is controlled to be switched on by the control signal, the demultiplexer is configured to make a difference between a potential reached by a rising edge of one fanout line of the plurality of fanout lines correspondingly connected to the one data line and a potential of the one data line to be less than a preset threshold.

12. A driving method for a multiplexed display panel, the multiplexed display panel comprising:

a plurality of sub-pixels arranged in an array;

a plurality of gate lines configured to scan a plurality of rows of the plurality of sub-pixels;

a plurality of data lines configured to input data signals to a plurality of columns of the plurality of sub-pixels; and a demultiplexer comprising a plurality of input channels configured to provide the data signals to the plurality of data lines, wherein each of the plurality of input channels is provided with a plurality of switching transistors and a plurality of fanout lines, each of the plurality of fanout lines is correspondingly connected to one data line of the plurality of data lines by one switching transistor of the plurality of switching transistors to provide one data signal of the data signals to the one data line, and the one switching transistor corresponding to each of the plurality of input channels is controlled by a same control signal to be switched on and switched off; and wherein the driving method comprises steps of:

scanning the plurality of sub-pixels row by row via the plurality of gate lines; and while each of the plurality of gate lines scans one row of the plurality of sub-pixels, and when a rising edge of the control signal reaches an amplitude and at a moment when the one switching transistor corresponding to each of the plurality of input channels is controlled to be switched on by the control signal, making a difference between a potential reached by a rising edge of one fanout line of the plurality of fanout lines correspondingly connected to the one data line and a potential of the one data line to be less than a preset threshold.

13. The driving method for the multiplexed display panel of claim 12, wherein the driving method further comprises the step:

after a falling edge of the control signal reaches zero (0), adjusting the potential of the one fanout line from the potential of the one data line via the demultiplexer.

14. The driving method for the multiplexed display panel of claim 12, wherein the driving method further comprises the step:

after a falling edge of the control signal reaches zero (0), adjusting a falling edge of the one fanout line to zero (0) via the demultiplexer before a rising edge of another control signal subsequent to the control signal reaches the amplitude.

15. The driving method for the multiplexed display panel of claim 12, wherein the said making the difference between the potential reached by the rising edge of the one fanout line and the potential of the one data line to be less than the preset threshold, further comprises the step:

before the rising edge of the control signal reaches the amplitude, adjusting the rising edge of the one fanout line from zero (0) to the potential of the one data line in advance.

16. The driving method for the multiplexed display panel of claim 12, wherein the said making the difference between the potential reached by the rising edge of the one fanout line and the potential of the one data line to be less than the preset threshold, further comprises the step:

before the rising edge of the control signal reaches the amplitude, reducing a duration that the rising edge of the one fanout line reaches the potential of the one data line from zero (0) via the demultiplexer.

17. The driving method for the multiplexed display panel of claim 16, wherein the duration that the rising edge of the one fanout line reaches the potential of the one data line from zero (0) ranges from 0.6 μs to 0.8 μs.

18. The driving method for the multiplexed display panel of claim 12, wherein the said making the difference between the potential reached by the rising edge of the one fanout line and the potential of the one data line to be less than the preset threshold, further comprises the step:

prolonging a duration that the rising edge of the control signal reaches the amplitude from zero (0).

19. The driving method for the multiplexed display panel of claim 18, wherein the duration that the rising edge of the control signal reaches the amplitude from zero (0) ranges from 0.3 μs to 0.4 μs.

20. The driving method for the multiplexed display panel of claim 12, wherein the preset threshold is 0.1 V.

* * * * *